Nov. 30, 1926.

A. S. J. STOVALL

BEARING

Original Filed July 14, 1923   3 Sheets-Sheet 2

1,608,913

WITNESSES
William P. Goebel
E. W. Savage

INVENTOR
A.S.J. STOVALL
BY Munn & Co.
ATTORNEYS

Nov. 30, 1926.
A. S. J. STOVALL
1,608,913
BEARING
Original Filed July 14, 1923  3 Sheets-Sheet 3
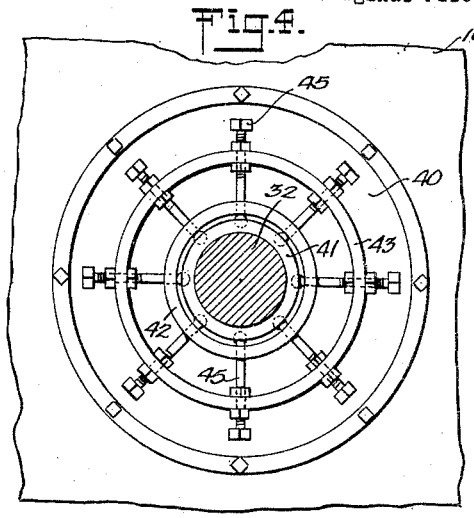
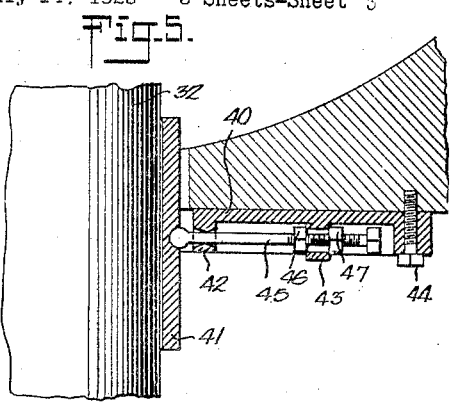
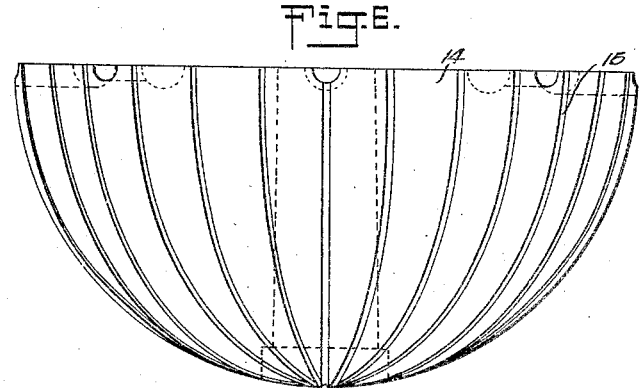
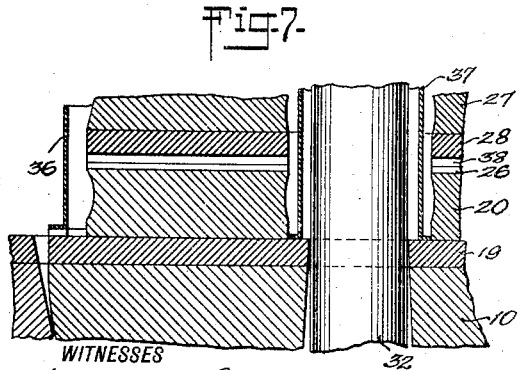
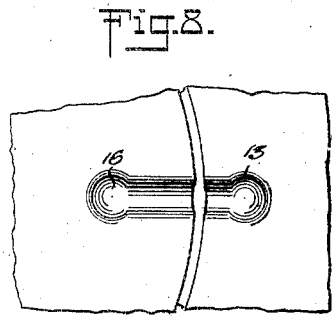
INVENTOR
A. S. J. STOVALL
BY
ATTORNEYS Patented Nov. 30, 1926.

1,608,913

UNITED STATES PATENT OFFICE.

ALBERT S. J. STOVALL, OF ELBERTON, GEORGIA.

BEARING.

Application filed July 14, 1923, Serial No. 651,541. Renewed October 16, 1926.

This invention relates to thrust bearings and was primarily designed for carrying heavy loads.

Ordinarily, it is extremely difficult to accurately machine thrust bearings designed for carrying heavy loads such as turbo-generators. If the bearing surfaces are slightly uneven there is an uneven pressure which in some parts of the bearing becomes excessive and may result in the breaking down of the oil filament that it is necessary to maintain between the moving parts. Further, if the shaft is not perfectly alined there will be a certain deflection in it, exerting an uneven pressure over the bearing surfaces. This excessive pressure will sometimes eliminate the filament of oil that should be continually maintained between the bearing surfaces in order to give efficient operation. In order to make for efficient and perfect operation it is necessary to provide a bearing that may be deflected with the shaft and which will adjust itself to overcome unevenness in the bearing surfaces.

The general object of this invention is the provision of a thrust bearing for carrying shafts capable of deflection with the shaft to maintain the pressure between the bearing surfaces evenly distributed.

A further object of the invention is the provision of a thrust bearing for carrying shafts, the bearing members of which are so mounted that they may be deflected to compensate for unevenness in the bearing surfaces to maintain the pressure between the bearing surfaces evenly distributed.

These objects are accomplished by providing a base for the thrust bearing having a socket formed therein, movably mounting in said socket a ball member, and locating on the ball member a bearing member on which a shaft-carrying bearing member is rotatably mounted.

These and other objects of the invention will be more clearly understood from the following detailed description and accompanying drawings.

Figure 4 is a bottom plan view of a shaft-alining unit mounted on the bottom of the thrust bearings;

Figure 5 is a vertical section through a portion of the shaft-alining unit showing its construction;

Figure 6 is a side elevation of the ball member;

Figure 7 is a vertical section along the line 7—7, Figure 3, showing the construction of the bearing members;

Figure 8 is a top plan view of portions of the base and ball members showing the depressions formed therein for receiving the members provided for connecting them.

Figure 1:
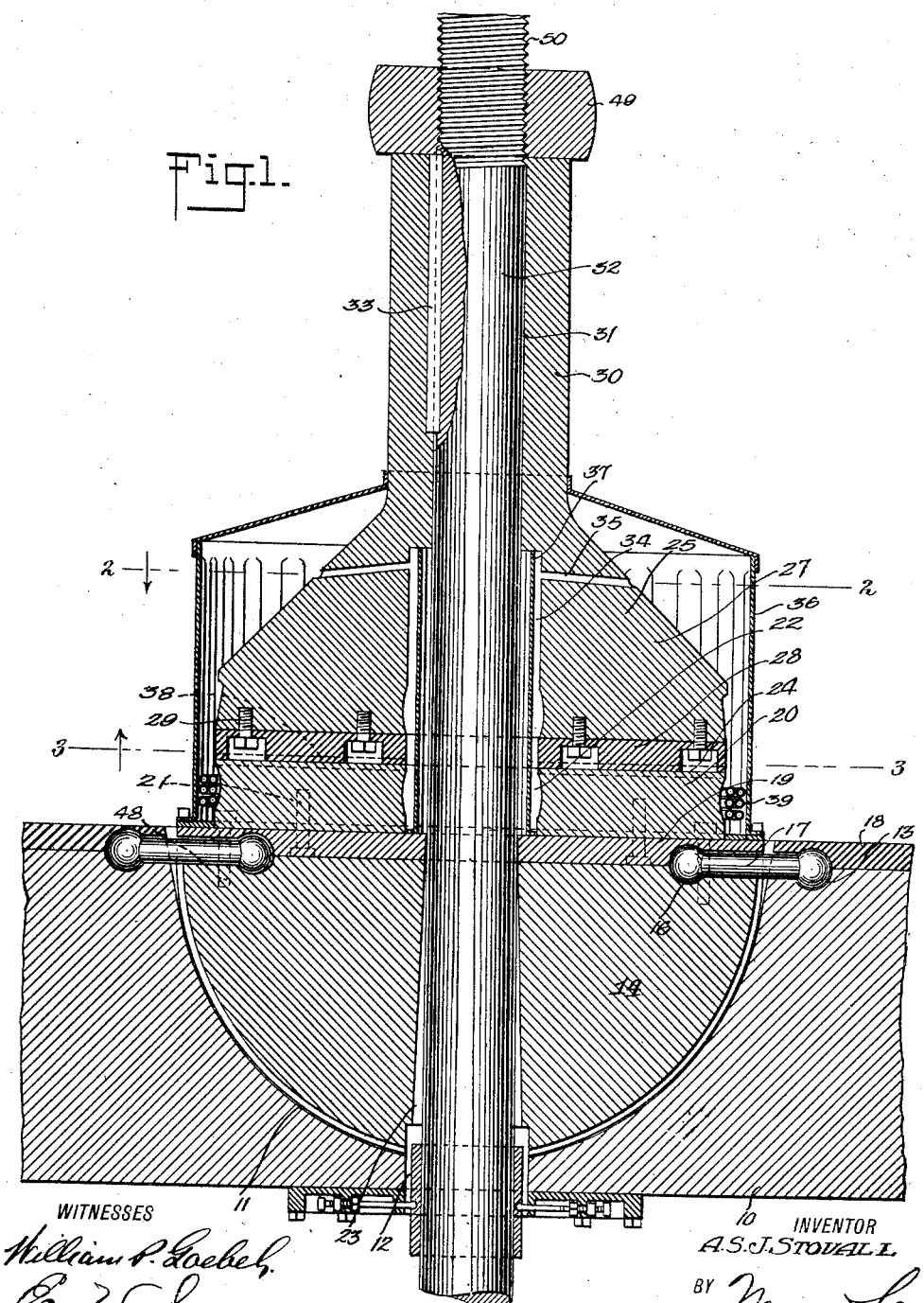
Figure 1 is a vertical section through the thrust bearing showing its construction.
Figure 2:
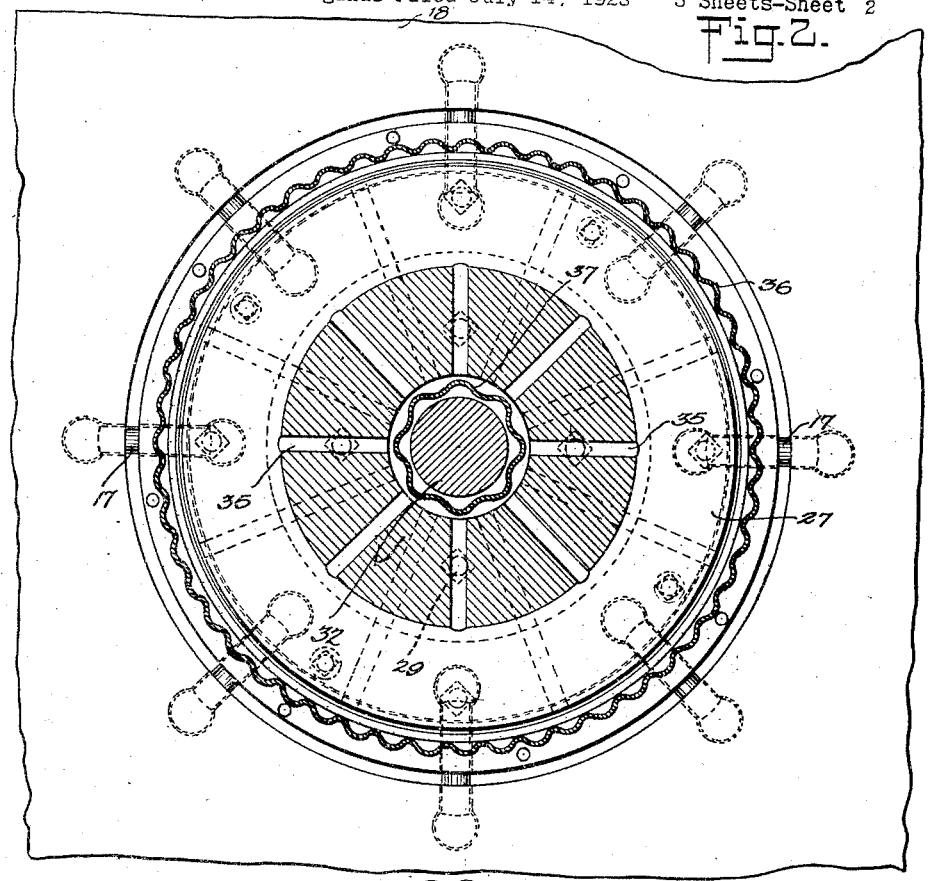
Figure 2 is a horizontal section along the line 2—2, Figure 1.
Figure 3:
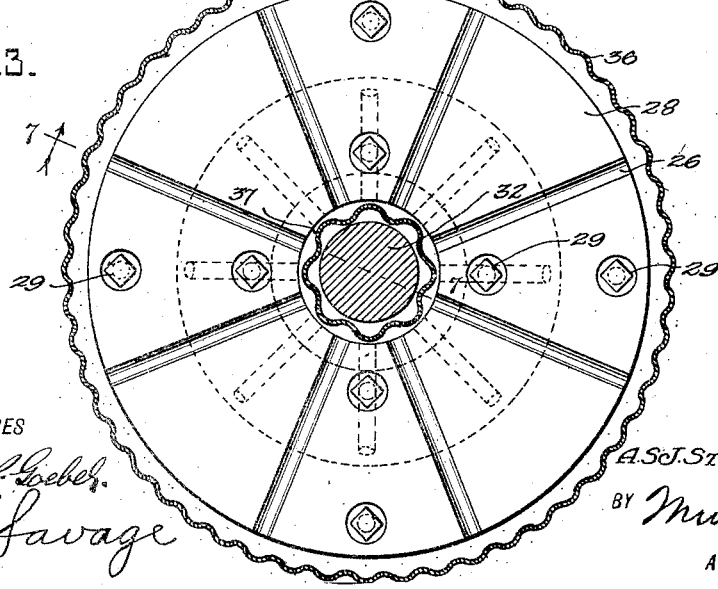
Figure 3 is a horizontal section of a thrust bearing along the line 3—3, Figure 1.

Referring to the above-mentioned drawings, the invention includes a base 10 having a socket 11, hemispherical in shape, formed therein. Leading from the bottom of this socket through the base 10 is an opening 12 through which a shaft may be projected. Formed in the upper surface of the base and spaced about the socket 11 is a plurality of depressions 13 for receiving the ends of dumb-bell shaped connecting members to be described later.

A ball member 14, shaped to fit the hemispherical socket 11, is mounted in said socket. Formed in the upper surface of this ball member are a plurality of depressions 16 for receiving the ends of the dumbbell shaped connecting members referred to above. These depressions are spaced about the ball member so as to aline with the depressions 13 provided in the base 10. A plurality of grooves 15 are provided in the ball member 14 for distributing a lubricant to the bearing surfaces of the ball and socket members. These grooves are spaced apart at the upper surface of the ball member but converge like meridian lines toward the bottom. Extending through the ball member 14 and alining with the opening 12 in the base 10 is a tapered opening 23 larger at the bottom than at the top.

A plurality of dumb-bell shaped connecting members 17 are provided for connecting the ball member 14 to the base 10. These dumb-bell shaped members are mounted in the depressions formed in the upper surfaces of the base and ball members. The ends of the dumb-bell shaped members positioned in the depressions in the base 10 are retained in position by annular plate 18 having depressions formed therein registering with the depressions formed in the upper face of the base. Positioned on the ball member 14 and attached thereto by screw bolts 48 is a plate 19 having depressions formed therein that register with the depressions 16 formed in the upper face of the ball member 14. These depressions in the plate 19 receive the upper portion of the dumb-bell shaped connecting members 17 and thus the plate retains them in position in the ball member. The depressions formed in the base, ball member and plates are of such a size that the dumb-bell shaped members 17 are loosely mounted, permitting a limited movement of the ball member 14 in the socket 11.

Mounted on the plate 19 and attached thereto by means of the countersunk bolts 21 is a bearing 20 made in the form of a plate. Extending through this bearing 20 is an axial opening 22 through which any shaft may be projected. This axial opening 22 alines with the opening 23 provided in the ball member 14. Grooves 26 are formed in the upper face of the bearing member 20 and extend from the axial opening 22 to its outer wall. The bearing 20 presents a flat bearing surface 24.

Mounted on the stationary bearing member 20 is a rotary bearing member 25 including a body 27 and a bearing plate 28 attached to the body by countersunk studs 29. Formed integral with the body 27 and extending upward is a stem 30. Extending along the axis of the stem 30, the body 27 and the bearing plate 28 is an opening 31 in which a shaft 32 is mounted and fixed to the stem by a key 33. The opening 31 alines with the openings 22, 23 and 12 and thus permits the shaft 32 to extend through all these members. The lower portion 34 of the opening 31 is enlarged as shown in Figure 1. Extending through the body 27 from the opening 34 is a plurality of ducts 35.

An oil pot is provided in conjunction with the bearing and includes a corrugated casing 36, mounted on the plate 19 and enclosing the bearing plates 20 and 28 and the body 27. Mounted in the opening 34 is an inner corrugated casing 37 spaced from the shaft 32. This inner casing extends the height of the opening and abuts against the upper wall, defining the enlargement 34 of the opening 31. The oil introduced into the casing 36 circulates through the grooves 26 provided in the bearing plate 20, radial grooves 38 provided in the bearing plate 28 and the ducts 35. In order to keep the oil at a proper temperature a plurality of water pipes 39 are mounted between the casing 36 and the bearing plate 20.

In order to properly aline the shaft 32 an adjusting unit is mounted on the base 10. This adjusting unit includes an annular plate 40 presenting two rims 42 and 43 attached to the base by means of set screws 44. Adjustably mounted in the rims 42 and 43 are a plurality of ball-headed set screws 45. These ball-headed set screws engage in openings provided in a sleeve 41 loosely mounted on the shaft 32. The set screws 45 may be locked in any desired position by means of nuts 46 and 47.

In mounting a machine on a thrust bearing of the type described above, the bearing members may be deflected to aline them with the shaft of the machine. This facilitates the installation of heavy machines such as turbo-generators and the like. When the machine has been installed and is in operation the shaft 32 may be slightly deflected and the bearing members of the thrust bearing may be deflected an equal amount by the shaft. Thus the pressure between the bearing plates 28 and 20 will be evenly distributed, giving the desirable operating conditions. If the bearing plates 28 and 20 present slightly uneven surfaces then during the operation of the shaft the ball member 14 may be deflected, serving to maintain the pressure between the bearing members evenly distributed.

The upper end of the shaft 50 is threaded and has mounted thereon a large nut 49 which seats on the stem 30. This nut is provided for adjusting the shaft 32 longitudinally to properly position the machine it supports.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

I claim:

1. A thrust bearing comprising a base having a socket formed therein and an opening extending therethrough leading from the base and being adapted for receiving a shaft, a ball member having an opening extending therethrough movably mounted in the socket, dumb-bell shaped members loosely mounted in openings provided in the base and ball member for limiting the movement of the latter in the socket, a bearing mounted on the ball member, said bearing having an opening therethrough alining with the opening in the ball member, and a shaft-carrying bearing movably mounted on the bearing carried by the ball member.

2. A thrust bearing of the character set forth comprising a stationary base member having a hemispherical socket in its upper face and a concentric opening extending downwardly from the socket through said base member, a hemispherical movable member having a concentric opening therethrough mounted in the socket of the base member, a means of connection between said members for permitting of a limited universal movement of the movable member in the socket of the stationary member, a shaft extending through the openings in said members, and a head keyed to said shaft, said head resting upon the movable member whereby the shaft and head are capable of rotation with respect to the stationary base, shaft alignment means carried by the under side of the stationary base for positively effecting and retaining the shaft in various alignments, said alignment means comprising an annular plate fixed to the under side of the stationary base, a pair of concentric annular depending rims on said plate, a socketed sleeve embracing the shaft, and a plurality of radial screws extending through the rims and threadedly engaging one of said rims and engaging in the sockets of the sleeve.

ALBERT S. J. STOVALL.